United States Patent
Greene et al.

(10) Patent No.: US 6,802,000 B1
(45) Date of Patent: Oct. 5, 2004

(54) SYSTEM FOR AUTHENTICATING ACCESS TO ONLINE CONTENT REFERENCED IN HARDCOPY DOCUMENTS

(75) Inventors: Daniel H. Greene, Sunnyvale, CA (US); R. Drews Dean, Cupertino, CA (US); Thomas A. Berson, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/429,539

(22) Filed: Oct. 28, 1999

(51) Int. Cl.⁷ ................................................ H04L 9/00
(52) U.S. Cl. ...................... 713/168; 713/183; 713/184; 713/185; 705/55; 705/57; 705/72; 705/18; 380/28; 380/44; 380/286
(58) Field of Search ........................... 380/44, 28, 286; 705/55, 57, 72, 18; 713/183, 184, 185, 168

(56) References Cited

U.S. PATENT DOCUMENTS

| | | | | |
|---|---|---|---|---|
| 4,445,712 A | * | 5/1984 | Smagala-Romanoff | 283/75 |
| 4,802,217 A | | 1/1989 | Michener | 380/29 |
| 4,926,481 A | | 5/1990 | Collins, Jr. | 380/25 |
| 4,992,783 A | * | 2/1991 | Zdunek et al. | 304/5.74 |
| 5,163,097 A | * | 11/1992 | Pegg | 713/183 |
| 5,253,295 A | * | 10/1993 | Saada et al. | 713/159 |
| 5,560,008 A | * | 9/1996 | Johnson et al. | 713/201 |

FOREIGN PATENT DOCUMENTS

| | | |
|---|---|---|
| WO | WO 97/01137 | 1/1997 |
| WO | WO 98/51036 | 11/1998 |

OTHER PUBLICATIONS

Wong, Raymond M. et al. "Polonius: An Identity Authentication System," Proceedings of the 1985 Symposium on Security and Privacy, IEEE Computer Society, Apr. 22–24, 1985, Oakland, California, pp. 101–107.

* cited by examiner

Primary Examiner—Gregory Morse
Assistant Examiner—Paul Callahan

(57) ABSTRACT

A system for controlling access to online content referenced in a hardcopy document. A user requesting access to online content available on a server responds to an authentication challenge from the server using a password mechanism printed in the hardcopy document. The password mechanism allows the user to identify a password for responding to an authentication request by the server. After authenticating the user, the server initiates a state change to enable subsequent access to the online content by the user with a different password that is also identified with the password mechanism.

18 Claims, 16 Drawing Sheets

FIG. 10
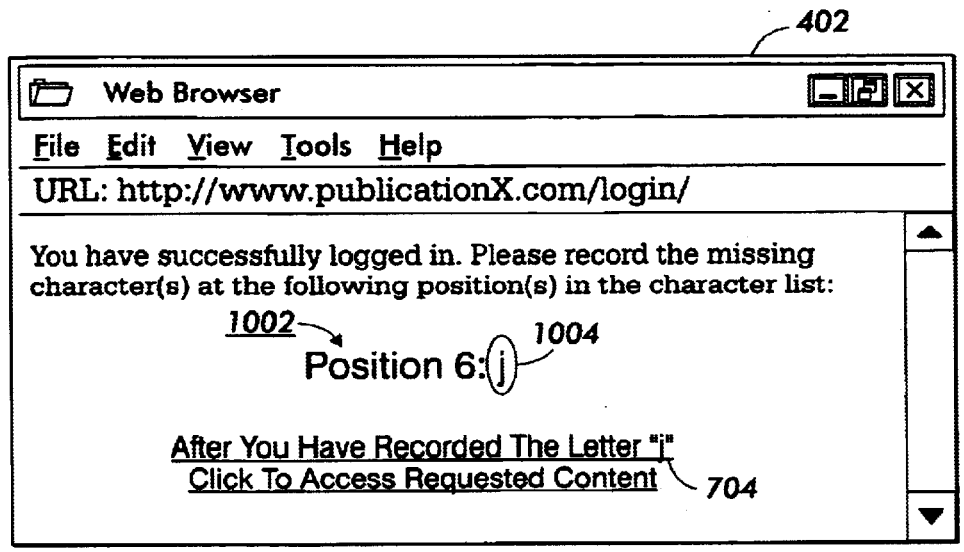
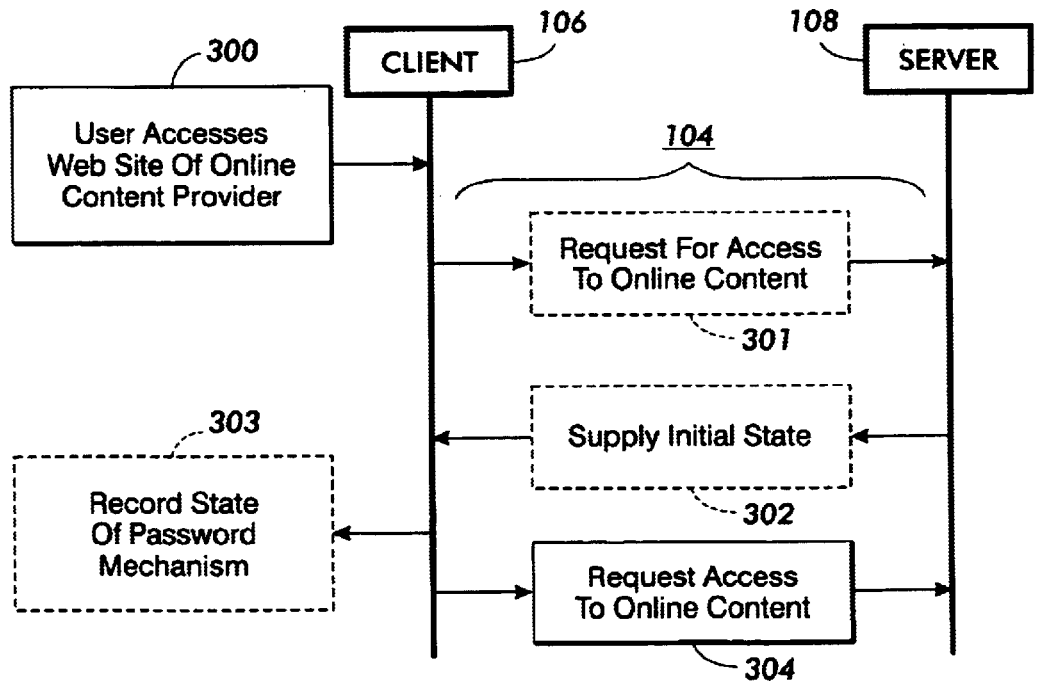
FIG. 11

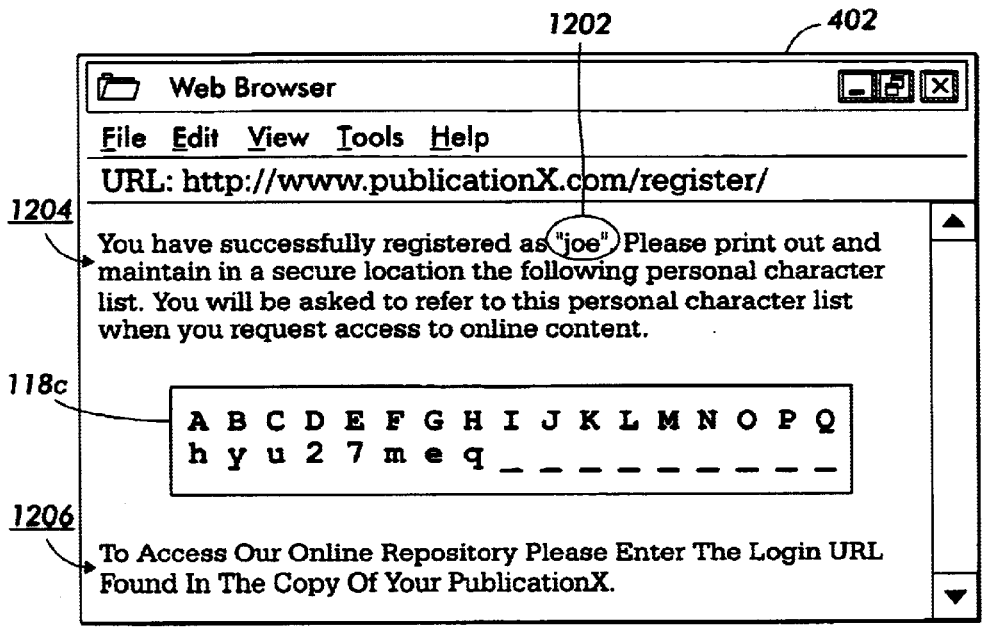

FIG. 22
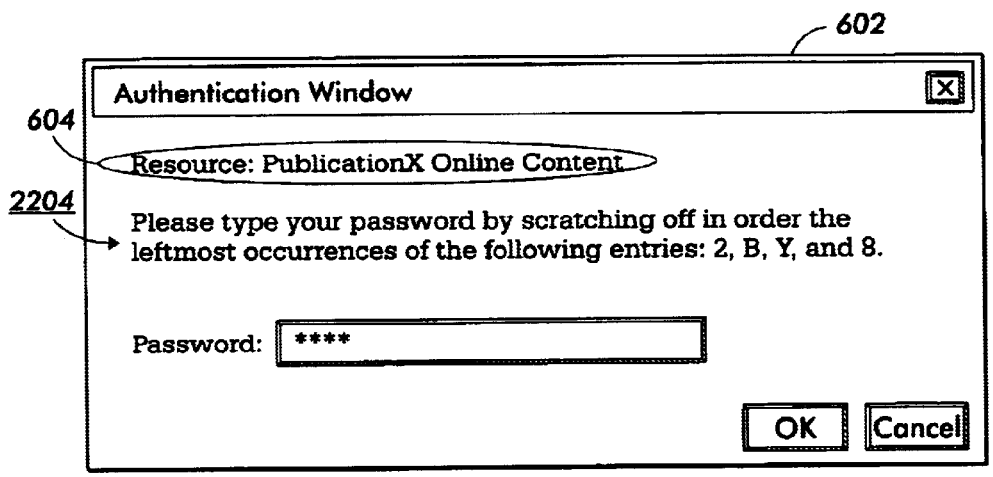
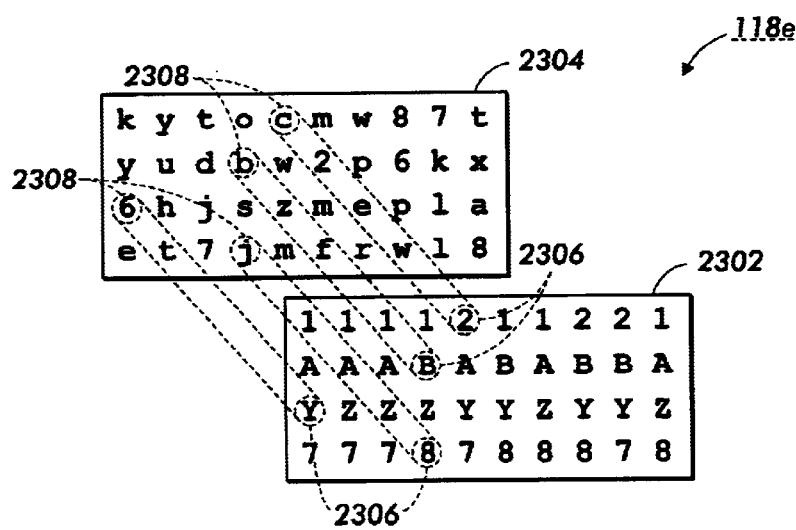
FIG. 23

SYSTEM FOR AUTHENTICATING ACCESS TO ONLINE CONTENT REFERENCED IN HARDCOPY DOCUMENTS

BACKGROUND OF THE INVENTION

1. Field of the Invention

The present invention relates generally to a system for authenticating requests to access online content, and more particularly, to a challenge and response system for managing requests for access to online content referenced in a hardcopy document.

2. Description of Related Art

Increasingly, hardcopy documents contain references to "online content". For example, references to online content may identify resources that are not available in hardcopy documents such as computer programs or electronic services that relate to content set forth in the hardcopy documents. More specifically, the type of online content referenced in a hardcopy document may include audio and video files (i.e., multimedia files), application programs, data files, electronic images, or any other data or program that may supplement or enhance content (e.g., an article) set forth in a hardcopy document.

A common approach for restricting access to online content stored on a server is performed by authenticating a simple password. The exchange of a simple password between a client and the server is defined herein as "a simple password exchange". More generally, a simple password exchange provides an authentication mechanism for the provider of online content to restrict access to selected users and/or track the use of services on a user-by-user basis. In some instances, the server enforces a limited number of accesses requested by any single password to avoid fraudulent or abusive access to restricted online content.

As disclosed by Wong et al. in "Polonius: An Identity Authentication System," published in the Proceedings of the 1985 Symposium on Security and Privacy, pp. 101–107, Apr. 22–24, 1985, Oakland, Calif., and incorporated herein by reference, the problem with a simple password exchange for authentication over insecure channels is that the information that is the basis for the authentication is reused. A simple password exchange is therefore vulnerable to attack (i.e., eavesdropping, playback, and exhaustive search) because the simple password is often repeatedly transmitted over an insecure channel before it is changed by the user or voided by the server.

In contrast, a one-time pad of passwords (hereinafter "one-time pad") provides a more reliable password authentication technique, as disclosed by Wong et al. After each valid authentication (i.e., transaction) performed using a one-time pad, the valid password between parties is synchronously changed. Advantageously when using a one-time pad, exposure of a password over an insecure channel does not compromise the security of subsequent transactions because knowing a previously valid password does not provide any information about the validity of subsequent passwords.

A variant of a one-time pad is a one-time password. Unlike one-time pads which change the entire password after each valid authentication, one-time passwords change at least some part of a password after each valid authentication. In other words, after each authentication no material of a password is reused with one-time pads, whereas with a one-time password some material may be reused. One drawback of both one-time passwords and one-time pads (collectively referred to herein as "a one-time list") is that it easy for one party to collusively use it with others (i.e., purposeful sharing). That is, the party being authenticated can readily copy and share the one-time list with others unbeknownst to the party performing the authentication.

Because of the increased use of references to online content in hardcopy documents, it would be desirable to provide a password mechanism that has the increased reliability of a one-time list over a simple password while making purposeful sharing through simple copying more difficult to carry out. Such a password mechanism would advantageously provide more robust authentication than a simple password while not requiring additional hardware to function properly. A further advantage of such a password mechanism is that it would be easily incorporated in a hardcopy document with a reference to the online content.

SUMMARY OF THE INVENTION

In accordance with the invention, there is provided a hardcopy document with a reference (e.g., a URL) to restricted online content and a password mechanism. In response to a request from a user to access the online content referenced in the hardcopy document, a server that controls access to the online content challenges the request. The challenge to the request from the server includes a hint for identifying a password from the password mechanism recorded in the hardcopy document. After successfully authenticating the password provided by the user in response to the challenge, the server issues a suggested state change to the password mechanism, thereby modifying the password for subsequent requests to access the online content.

In accordance with one aspect of the invention, there is provided a method and apparatus therefor, for providing secure access to online content referenced in a hardcopy document. Initially, in response to a first request for access to the online content referenced in the hardcopy document, a server issues a challenge to the first request for online content. After receiving a first password derived from a password mechanism in the hardcopy document in response to the issued challenge, the server suggests a state change to the password mechanism on the hardcopy document for identifying a second password to be used during a second request for access to the online content referenced in the hardcopy document.

BRIEF DESCRIPTION OF THE DRAWINGS

These and other aspects of the invention will become apparent from the following description read in conjunction with the accompanying drawings wherein the same reference numerals have been applied to like parts and in which:

FIG. 10 illustrates a suggested state change to the password mechanism shown in FIG. 8;

FIG. 11 illustrates additional steps of the communication sequence set forth in FIG. 3 for performing the third embodiment of the password mechanism shown in FIG. 2, referred to herein as user authentication that includes referencing both a personal password mechanism and a document password mechanism;

FIG. 12 illustrates initializing the state of a personal password mechanism;

FIG. 13 illustrates an example of a challenge to a request for online content with the personal password mechanism shown in FIG. 12 and the document password mechanism shown in FIG. 8;

FIG. 22 illustrates an example of a challenge to a request for online content that includes a suggested state change to the password mechanism illustrated in FIG. 23;

FIG. 23 illustrates a fifth embodiment of the password mechanism shown in FIG. 2 that allows visual identification of state;

DETAILED DESCRIPTION

A. Operating Environment

Figure 1:
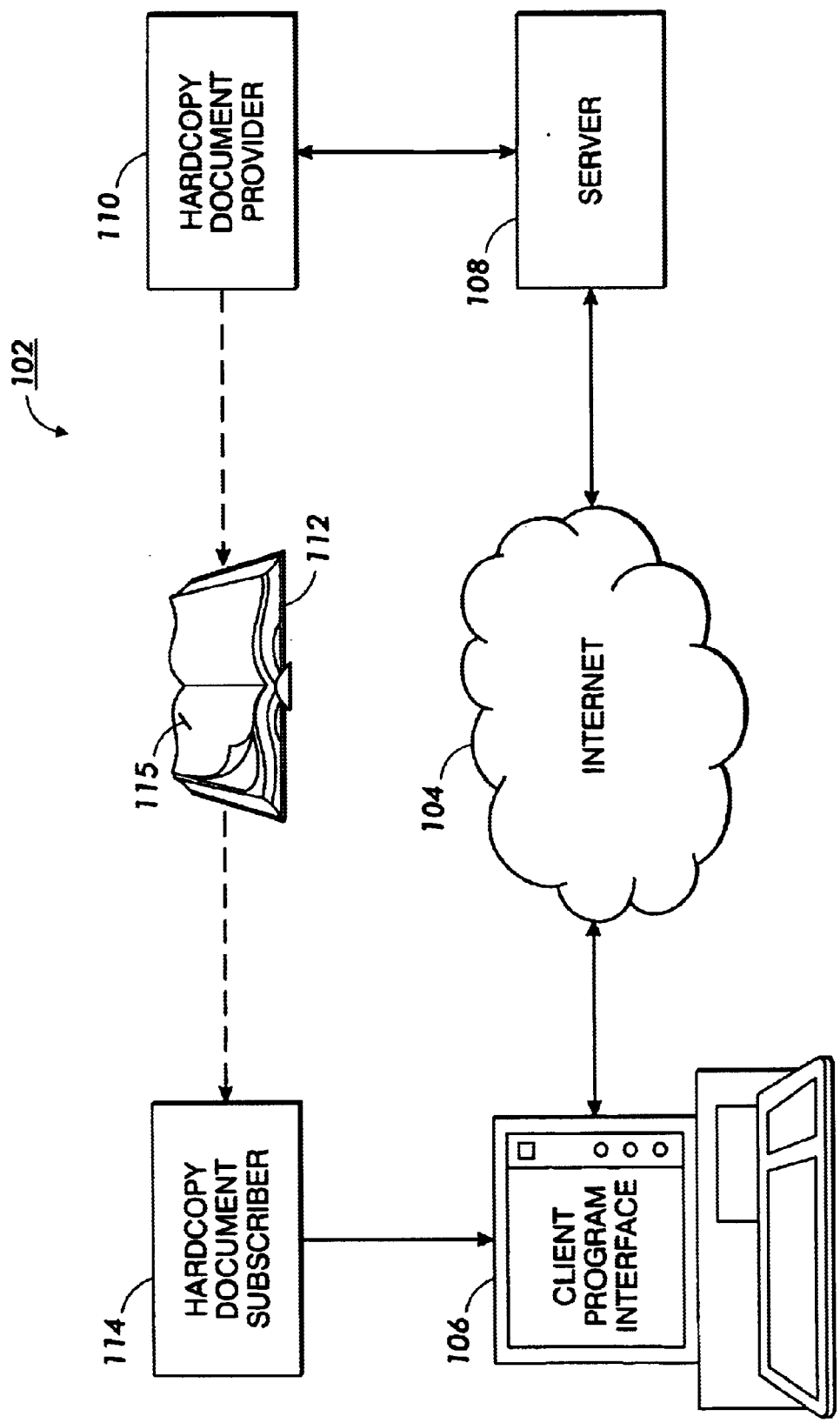
FIG. 1 illustrates an operating environment for performing the present invention.

FIG. 1 illustrates an operating environment 102 for performing the present invention. The operating environment 102 includes a network 104 (e.g., the Internet or an intranet) that serves as a communication channel through which a client program interface 106 gains access to online content controlled by a server 108 (e.g., web server) operated for example by an online content provider. In addition, the operating environment 102 includes a hardcopy document provider 110 that distributes a hardcopy document 112 to a hardcopy document subscriber 114 (i.e., user).

It will be appreciated by those skilled in the art that the server 108 forming the operating environment 102 can be arranged in different configurations. In one configuration, the server 108 performs both authentication services and distribution services. In an alternate configuration, the authentication services and distribution services are performed on independent servers. In one embodiment of these configurations, the distribution of online content is performed using a web server that integrates application programs and the online content. In an alternate embodiment of these configurations, distribution is performed using an application server for operating the application program and a backend database server for storing online content.

Figure 2:
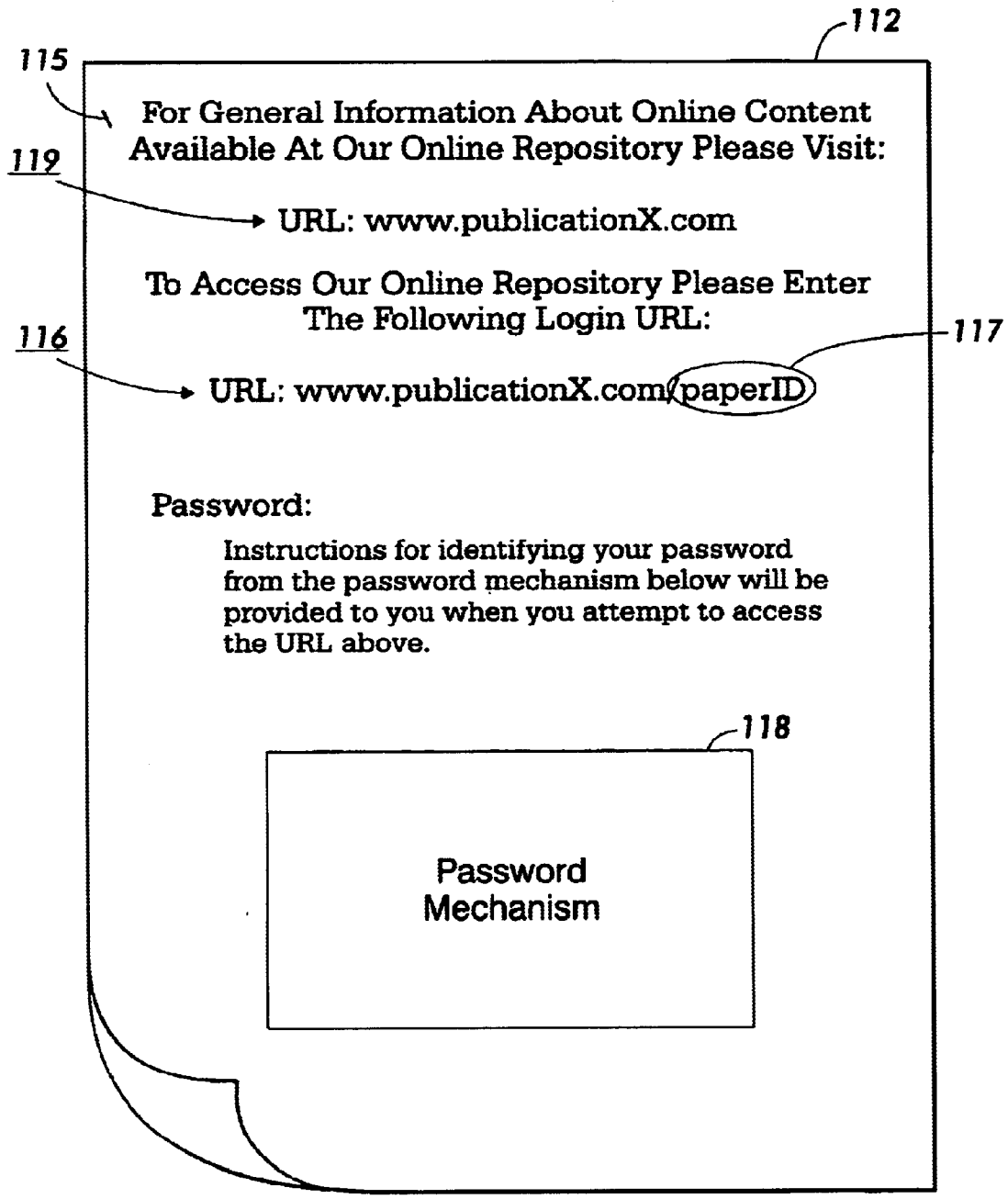
FIG. 2 illustrates a detailed view of a page of the hardcopy document shown in FIG. 1 that includes a reference to online content and a password mechanism for responding to challenges to requests for access to the online content.

FIG. 2 illustrates a page 115 of the hardcopy document 112 (e.g., newspaper, periodical, flyer, brochure, magazine, book, manual) that includes a login reference 116 to online content available on the sever 108. In addition, the page 115 includes a password mechanism 118 for responding to challenges issued by the server 108 in response to requests for access to the online content by the client 106. In an alternate embodiment, the login reference 116, which is printed on a recording medium such as paper, is included as part of the hardcopy document 112 in the form of an attachment or an insert.

In accordance with the invention, the password mechanism 118 allows the hardcopy document subscriber 114 to identify a password for responding to a challenge (i.e., an authentication request) from the server 108. The challenge involves the authentication of the hardcopy document and/or user. Five different embodiments for the password mechanism 118 are described below in sections B.1–B.5. Generally, each password mechanism described below provides means for responding to a challenge issued by the server 108 in response to a request for access to password restricted online content (i.e., subscriber content). Subsequent to being properly authenticated, the server issues a state change to the password mechanism 118 in a form that a person can read or use.

The state change of the password mechanism after each authentication advantageously reduces the likelihood that access to online content will be successful because a previously used password was compromised by an attack. In addition, the state change of the password mechanism after each authentication advantageously increases the effort required for subscribers and non-subscribers to collude and share the password mechanism 118 together. This advantage of the invention deters shared access to online content by requiring a user (i.e., subscriber) to continuously exchange each state change of the password mechanism issued by the server 108 with the non-subscriber. That is, collusion between a subscriber and a non-subscriber cannot be accomplished simply by copying because collusive use requires that both the subscriber and non-subscriber maintain the state of the password mechanism, which is updated after each successful authentication session.

B. Overview of Challenge and Response Password Mechanisms

Figure 3:
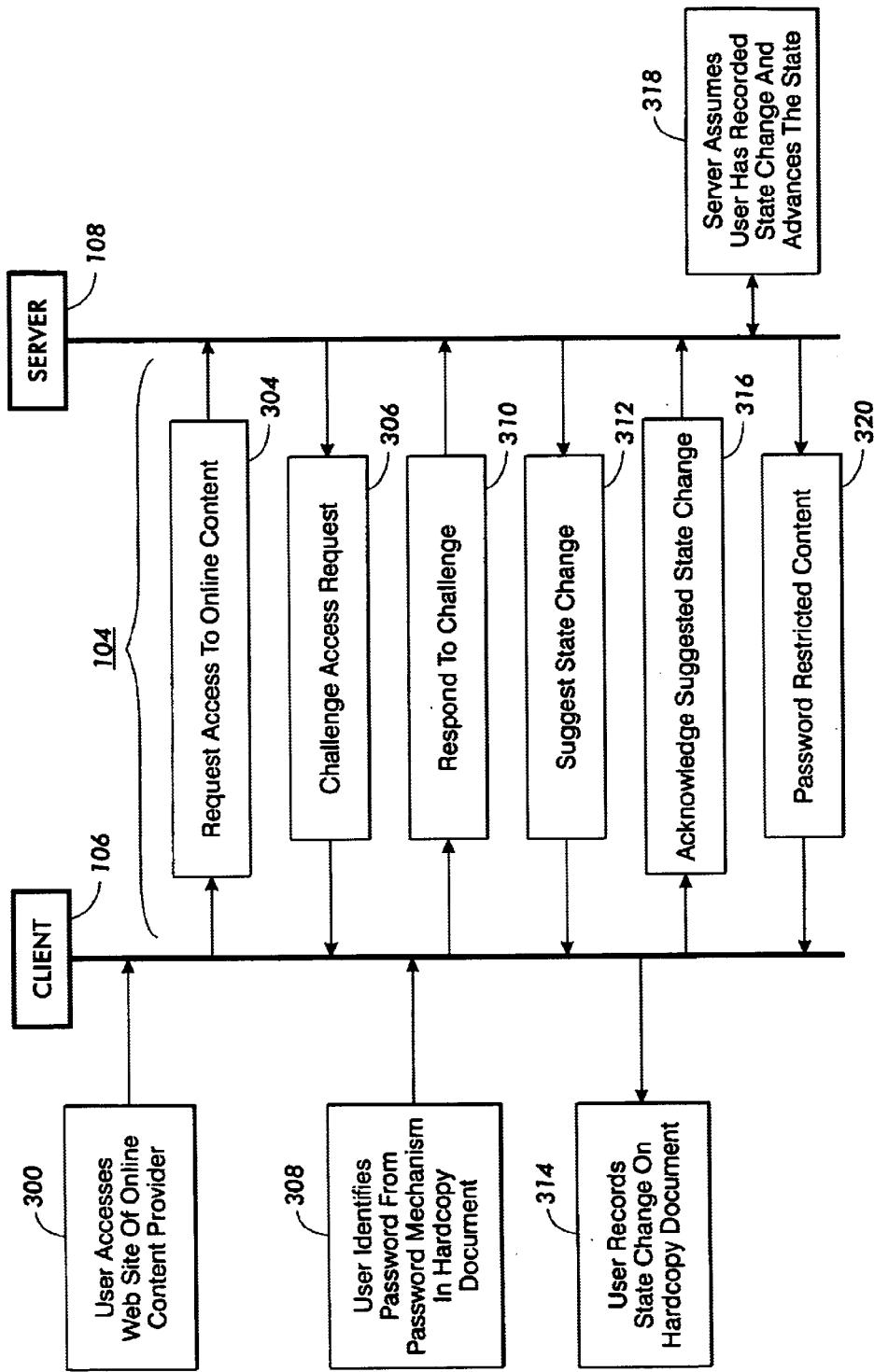
FIG. 3 sets forth steps of a communication sequence between the client and the server for authenticating requests for access to online content referenced in the hardcopy document with the password mechanism shown in FIG. 2.

FIG. 3 sets forth steps of a communication sequence between the client 106 and the server 108 for authenticating requests for access to online content referenced in the hardcopy document 112 with the password mechanism 118. These steps are set forth initially because they can be applied in whole or in part to each password mechanism discussed below in sections B.1–B.5. The communication sequence begins at step 300 after a user (i.e., hardcopy document subscriber 114) requests access to online content using a reference in the hardcopy document 112 that identifies the location of the online repository.

In the embodiment illustrated in FIG. 2, a user requests access to online content at step 300 by inputting the login reference 116 (i.e., login URL) recorded on page 115 of the hardcopy document. 112. The login reference 116, which is in the form of a uniform resource locator (URL), is input by the user into a World Wide Web (i.e., web) browser (e.g., Netscape Communicator or Internet Explorer) operating on the client program interface 106. The login URL 116 includes a paper identifier (i.e., "paperID") 117 that allows the server 108 to identify which hardcopy document 112 the request for access to online content originates.

Figure 4:
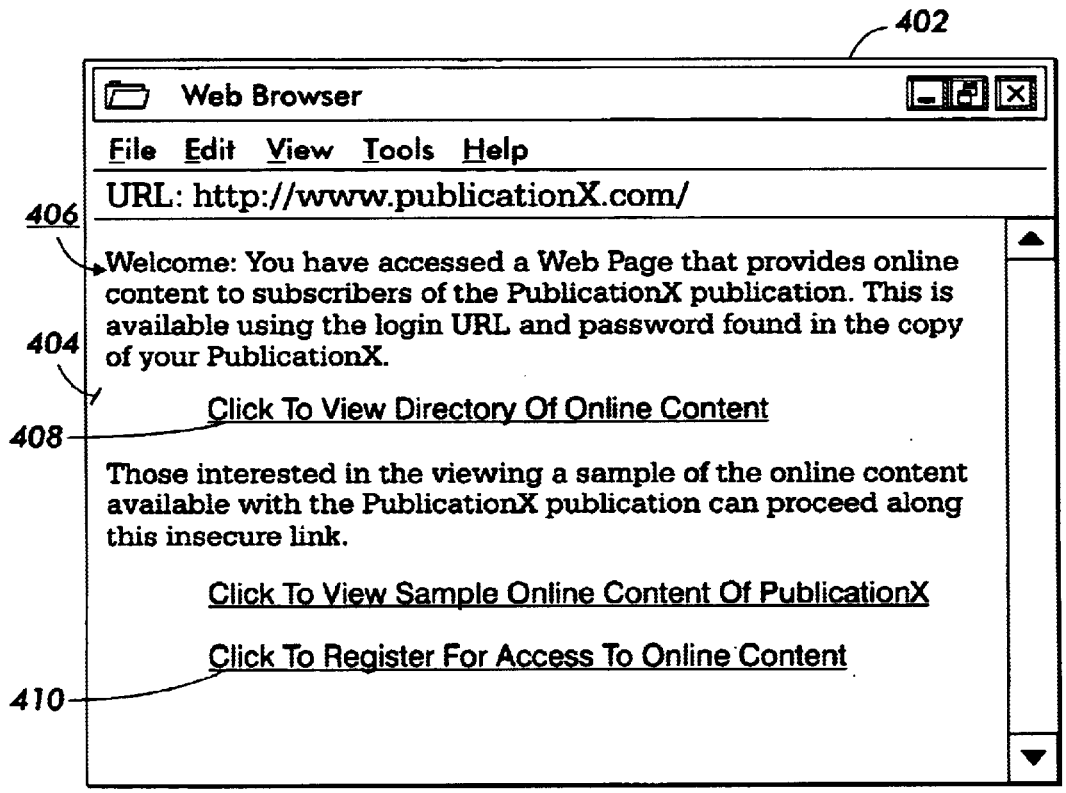
FIG. 4 illustrates a page in a World Wide Web document that is accessed using a general reference in the hardcopy document illustrated in FIG. 2.

In addition, the page 115 of the hardcopy document 112 includes a URL 118 for accessing general information about the online repository of information. FIG. 4 illustrates an example of a web browser 402 that is open to a page in a World Wide Web document (i.e., web page) 404 that describes general information concerning the online content provider. More specifically, the web page 404 includes instructions 406 for accessing the online content as well as a link 408 to a directory of available online content.

Upon receipt of the request for access, the server 108 issues a challenge at step 306. The challenge includes instructions or a hint for identifying, at step 308, a password for responding to the challenge, at step 310. Examples of challenges performed in accordance with the present invention are illustrated in an authentication window 602 shown in FIGS. 6, 9, 13, 17, and 22. When an invalid password is received in response to an issued challenge, step 306 is repeated. In the event an excessive number of invalid passwords are received at step 310, the server 108 may invalidate future authentication attempts using the paper identifier 117 of the hardcopy document.

Once a valid password that responds to the challenge issued at step 306 is received, the server 108 transmits a suggested state change to the password mechanism 118 at step 312. After receiving and recording the suggested state change at step 314, the user acknowledges the suggested state change with the client 106, at step 316. Upon receipt of the acknowledged state change, the server 108 assumes that the suggested state change has taken place at step 318. After this state transition, the server 108 assumes that the user will respond to subsequent challenges with a new password that is identified on or derived from a password mechanism 118 that has been modified at step 314. That is, after the user has acknowledged recording the suggested state change, the server invalidates the previous password and then allows access to a subsequent request for online resources using a new password. The new password can either be identified by the suggested state change at step 312 or during the challenge to the access request at step 306.

In accordance with another aspect of the invention, the server 108 makes the requested online content available to the user through client 106 at step 320 only after the current password has been invalidated at step 318. If the acknowledgment at step 316 is never received, the server 108 does not allow access to the online content. However, in response to the lack of an acknowledgment at step 316, the server 108 maintains the validity of the current password as well as any password completed by the suggested state change at step 312. If the a new request for online content is received using the current password, then the suggested state change that may have been previously completed by the suggested state change is presumed not to have successfully occurred. Thus, even if there exists a communication failure over channel 104, there is always at least one valid password to permit access to online content that the user considers valid. This recovery scheme allows for failure while maintaining the number of access to online content to the number available with the particular password mechanism being utilized.

B.1 Activated Password Lists

Figure 5:
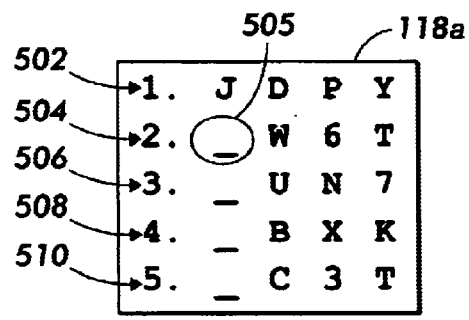
FIG. 5 illustrates a first embodiment of the password mechanism shown in FIG. 2, which is referred to herein as an activated password list.

FIG. 5 illustrates a first embodiment of the password mechanism 118 illustrated in FIG. 2. The password mechanism 118a shown in FIG. 5 is referred to herein as an "activated password list." The activated password list 118a includes a list of partial (i.e., incomplete) passwords. In the embodiment shown in FIG. 6, the password list 118a consists of a first complete password 502 that is used to respond to a first challenge 310 in FIG. 3, and four partial passwords 504, 506, 508, and 510. In a variant of this embodiment of the invention, the first password is a partial password that is completed during an initialization of state (at step 302, FIG. 11) after registration (step 301, FIG. 11), the details of which are described below in section B.3.

In accordance with the activated password list 118a, incomplete passwords are completed during a suggested state change (step 312, FIG. 3). When using an activated password list 118a, a user identifies a specific password from the activated password list 118a to respond to a challenge to a request for online content from the server 108. Once the server 108 verifies that the response to the challenge is correct, the server suggests a state change to the user's password list 118a. In this embodiment, the suggested state change is a character that is recorded by the user in a blank space (e.g., space 505) at the beginning of the next incomplete (i.e., unused) password in the password list 118a. By sending a single character rather than the entire next password, the server 108 advantageously minimizes the amount of recording required by the user. In addition, transmitting less than the entire next password eliminates transmitting the entire password over what might be an insecure communication channel vulnerable to attack.

Figure 6:
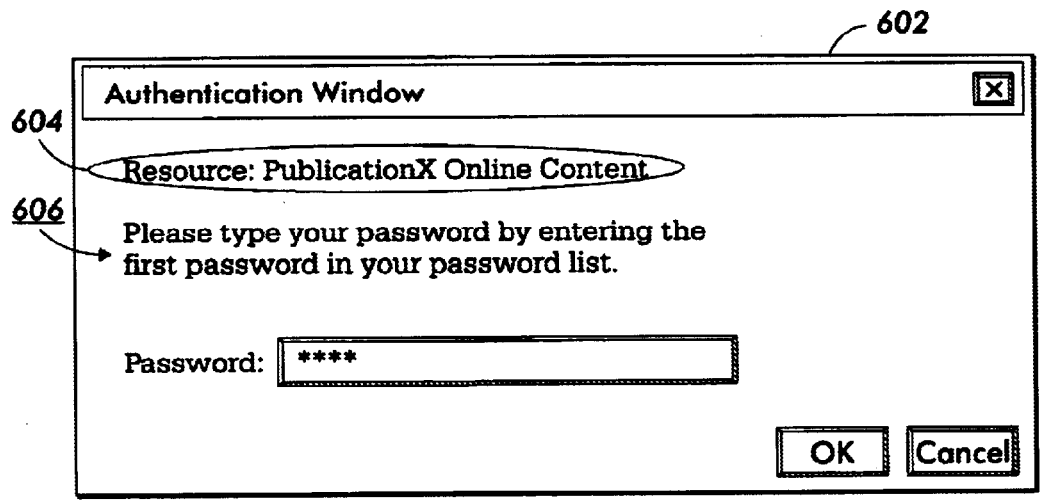
FIG. 6 illustrates an example of a challenge to a request for online content with the activated password list shown in FIG. 5.

FIG. 6 illustrates an example of a challenge to a request for online content that is received by a user when the hardcopy document contains an activated password list 118a (step 306, FIG. 3). More specifically, the challenge requesting entry of a password which is received by the user is set forth in an authentication window 602 that is displayed on the client program interface 106. A "resource" identifier 604 in the authentication window 602 sets forth the online content the user of the client 106 is attempting to access. In addition, the authentication window 602 includes instructions 606 (i.e., a hint) for selecting a password from the activated password list 118a located with the login URL 116 in the hardcopy document 112. In this example, the proper response (step 310, FIG. 3) to the challenge (step 306, FIG. 3) is the first password 502 in the list, which is the list of characters "JDPY".

Figure 7:
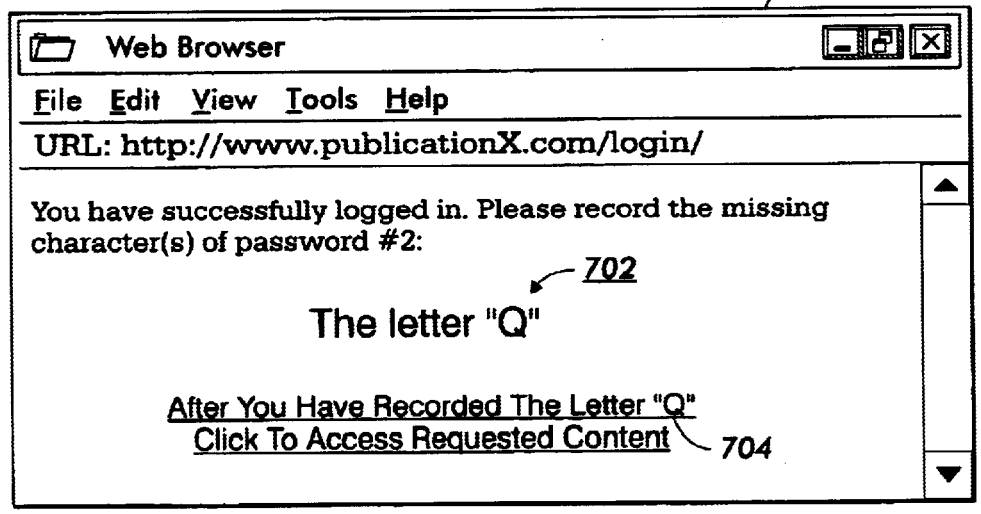
FIG. 7 illustrates a suggested state change to the activated password list shown in FIG. 5.

FIG. 7 illustrates a suggested state change (step 312, FIG. 3) for the password mechanism 118a shown in FIG. 5. More specifically, FIG. 7 illustrates a web browser 402 that indicates that a successful login has been achieved. In addition to indicating when a successful login has been achieved, instructions 702 in the web browser 402 suggest a state change to a partial password in the activated password list 118a. In this example, the suggested state change involves adding a missing character "Q" to the second password in the activated password list 118a. By selecting link 704 after recording the suggested state change (step 314, FIG. 3), the user acknowledges the suggested state change (step 316, FIG. 3) while the server provides access to the requested online content (step 320, FIG. 3).

B.2 Rolling Activation

Figure 8:
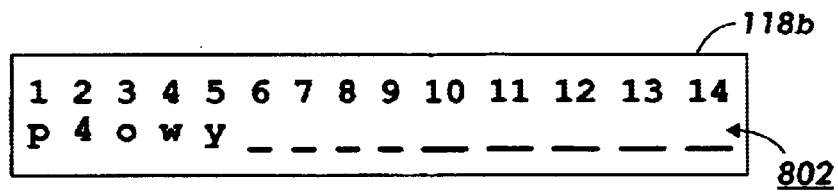
FIG. 8 illustrates a second embodiment of the password mechanism shown in FIG. 2, which is referred to herein as rolling activation.
Figure 9:
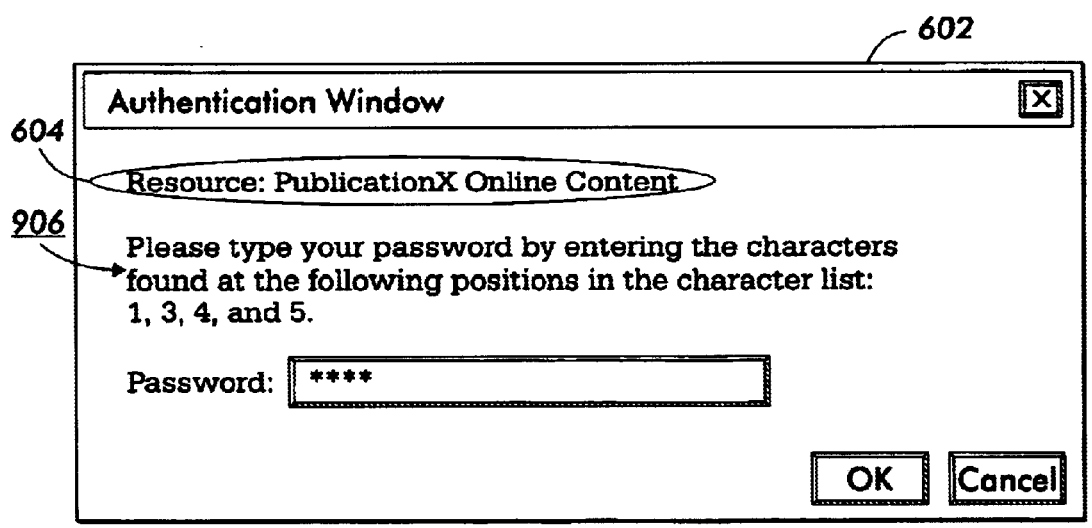
FIG. 9 illustrates an example of a challenge to a request for online content with the password mechanism shown in FIG. 8.

FIG. 8 illustrates a second embodiment of a password mechanism 118b for performing the present invention. The password mechanism 118b is a variation of the activated password list 118a shown in FIG. 5. In this embodiment, the password mechanism 118b, which is referred to herein as rolling activation, permits the server 108 to issue challenges that require the user to identify selected characters in an ordered list of characters 802. FIG. 9 illustrates an example of a challenge (i.e., step 306 in FIG. 3) to a request for online content with the password mechanism 118b. The challenge in this instance of the authentication window 602 includes instructions 906 that request the user identify a password in the password mechanism 118b by identifying the characters at selected positions in the ordered list of characters 802. In this example, the correct response to the challenge is the list of characters "powy". Note that the correct response for the challenge issued in FIG. 9 does not require the recitation of all of the available characters. In addition, it will be appreciated by those skilled in the art that the characters can be requested out of order (e.g., selected from the positions 3, 1, 5, and then 4).

FIG. 10 illustrates one manner in which a state change is suggested for the rolling activation password mechanism 118b. Specifically, the state change identifies a position 1002 (e.g., the position "6") and a character 1004 to be filled in at that position (e.g., the character "j"). In one embodiment, the missing characters are supplied sequentially one by one (e.g., character 6, then 7, etc.). Providing a user with one missing character at a time and in a sequential order as illustrated in FIG. 10 is the easiest scheme for a user to understand and manage. In an alternate embodiment, the list of characters 702 are supplied in any quantity and/or any order. While the rolling activation password mechanism 118b can be advantageously reproduced in less space in the hardcopy document 112 than the password list 118a shown in FIG. 5, rolling activation does require more care by a user when responding to a challenge.

B.3 User Authentication

A third embodiment of a password mechanism 118 for performing the present invention is referred to herein as "user authentication". This third embodiment authenticates a user as well as the hardcopy document 112 using a dual password system. The dual password system includes a hardcopy document password mechanism as well as a personal password mechanism. To initiate the state of the personal password mechanism additional steps to the steps shown in FIG. 3 are performed. More specifically, after performing the step 300 but before performing step 304, the steps 301–303 shown in FIG. 11 are performed.

Initially at step 301 shown in FIG. 11, a user registers for access to online content by selecting for example link 410 of the browser shown in FIG. 4. After successfully registering for access to online content, the server 108 initializes the state of a user's personal password mechanism and provides a user identifier (i.e., user name or account name) at step 302. At step 303, the user records the initial state of the personal password mechanism. For example, the user may be required at step 303 to print out the personal password mechanism 118c as set forth in the instructions 1204 illustrated in FIG. 12. Note that the instructions 1204 include the user identifier 1202 that is associated with the personal password mechanism 118c.

After reproducing the personal password mechanism 118c, the user can request access to online content by entering the login URL 116 (i.e. paper identifier) found on page 115 of the hardcopy document 112 as specified at instructions 1206 in FIG. 12. The challenge issued by the server 108 (step 306, FIG. 3) in response to the request for access (step 304, FIGS. 11 and 3) to online content in this third embodiment of the invention involves the authentication of the paper identifier 117 and the user identifier 1202 with a password that is derived from both the document password mechanism 118b and the personal password mechanism 118c.

An example of a challenge that responds to a request for access to online content that invokes the dual password system of this embodiment is illustrated in the instance of the authentication window 602 shown in FIG. 13. More specifically, the challenge illustrated in FIG. 13 includes instructions 1302 that request that a user input a user identifier (i.e., "User ID") 1202 and a password 1304 derived using characters from both the personal password mechanism 118c (i.e., "personal character list") and the document password mechanism such as the document character list 118b shown in FIG. 8. In this example, the correct response to the challenge is the list of characters "4wyy2q".

Figure 14:
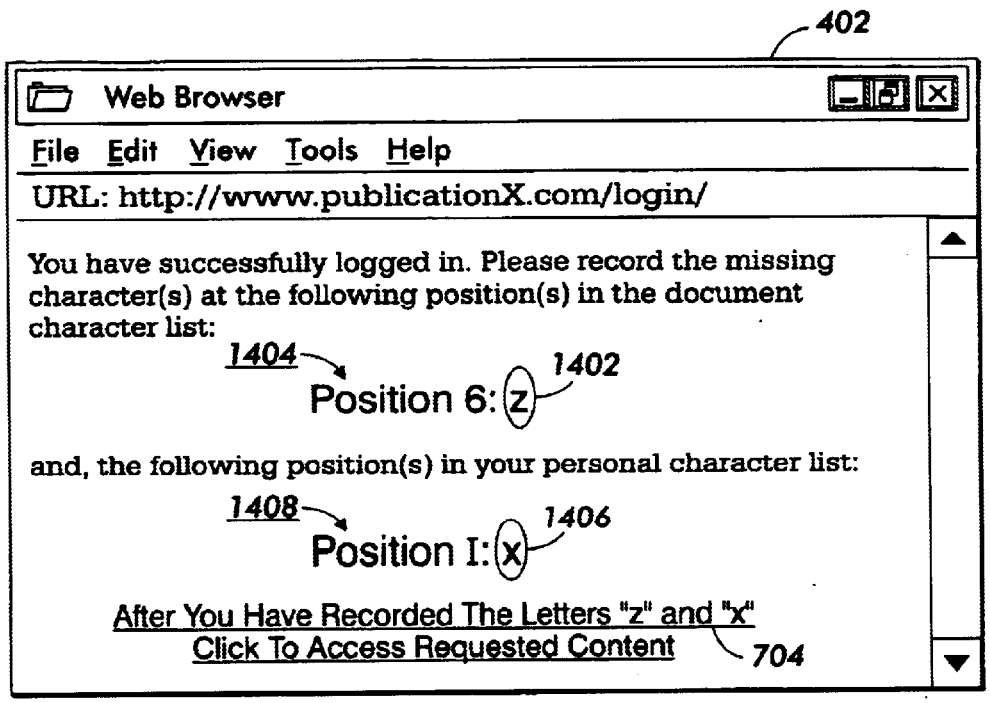
FIG. 14 illustrates a suggested state change to the personal password mechanism shown in FIG. 12 and the document password mechanism shown in FIG. 8.

If both the characters from the personal password mechanism 118c and document password mechanism 118b are correct then the server 108 suggests a state change (step 312, FIG. 3) by supplying extensions to both password mechanisms 118b and 118c as shown for example in FIG. 14. More specifically in FIG. 14, the suggested state change is accomplished by supplying a character 1402 for a specified position 1404 in character list of the hardcopy document password mechanism 118b and a character 1406 for a specified position 1408 in the personal password mechanism 118c. Subsequent to supplying the missing characters, the user effectively acknowledges the state change by selecting link 704 to access the requested online content.

This embodiment of the invention advantageously allows the server 108 to audit both the user and the hardcopy document 112. In addition, this embodiment can be advantageously used to establish and manage property rights of the hardcopy document 112. For example, this embodiment could be used to identify illegitimate uses of online resources by tracking individual use. In a variant of this embodiment of the invention, the online registration for acquiring a personal password mechanism 118c shown in FIG. 12 is received by the user (i.e., hardcopy document subscriber) in hardcopy form in a similar manner to the document password mechanism 118b. In this alternate embodiment, the personal password mechanism 118c could either be included with or delivered separate from the document password mechanism 118b in hardcopy document 112.

B.4 Subset Selection

Figure 15:
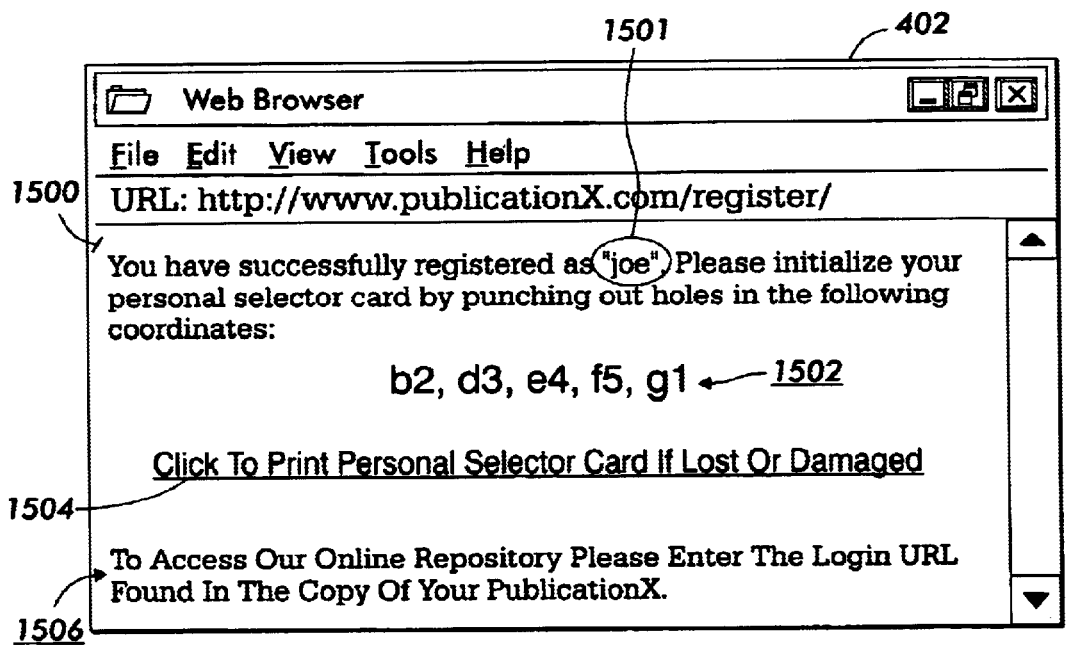
FIG. 15 illustrates instructions for initializing a personal selector card in accordance with a fourth embodiment of the invention.

FIGS. 15–20 illustrate a fourth embodiment of the password mechanism 118 for performing the present invention. This fourth embodiment increases the difficulty of copying the password mechanism 118 through subset selection with a personal selector card. The communication sequence between the client 106 and the server 108 include the steps set forth in FIGS. 11 and 3. For clarity these steps are referenced in parenthesis throughout the description of this embodiment of the invention. In accordance with this embodiment, the user registers with the server 108 (step 301, FIG. 11) to receive state information for initializing a personal selector card (step 302, FIG. 11). FIG. 15 illustrates an example in which the user receives on a web page 1500 of the web browser 402. The web page 1500 includes instructions 1502 for initializing a personal selector card and a user identifier (i.e., User ID) 1501 that is associated with the personal selector card being initialized.

Figure 16:
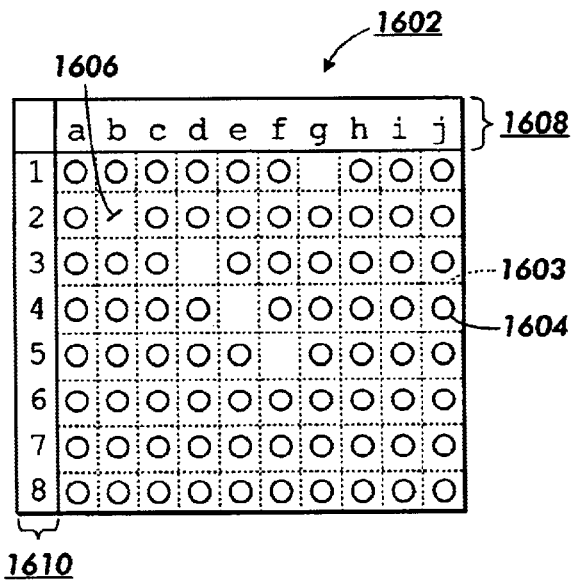
FIG. 16 illustrates an example of a personal selector card.

An example of a personal selector card 1602 for carrying out this embodiment of the invention is illustrated in FIG. 16. The personal selector card 1602 shown in FIG. 16 includes a matrix 1603 of perforated sites (e.g., site 1604) that are removed to create holes (e.g., hole 1606) in the matrix 1603. In one embodiment, the perforated sites are addressed using row labels 1608 and column labels 1610. When the personal selector card 1608 is not included as part of the hardcopy document 112, a user can print the personal selector card 1602 by accessing link 1504 before initializing it using the instructions 1502 shown in FIG. 15 (step 303, FIG. 11). Subsequent to creating and/or initializing the personal selector card 1602, the user requests access to online content by entering the login URL 116 found on page 115 of the hardcopy document 112 as specified at instructions 1506 (step 304, FIG. 3).

Figure 17:
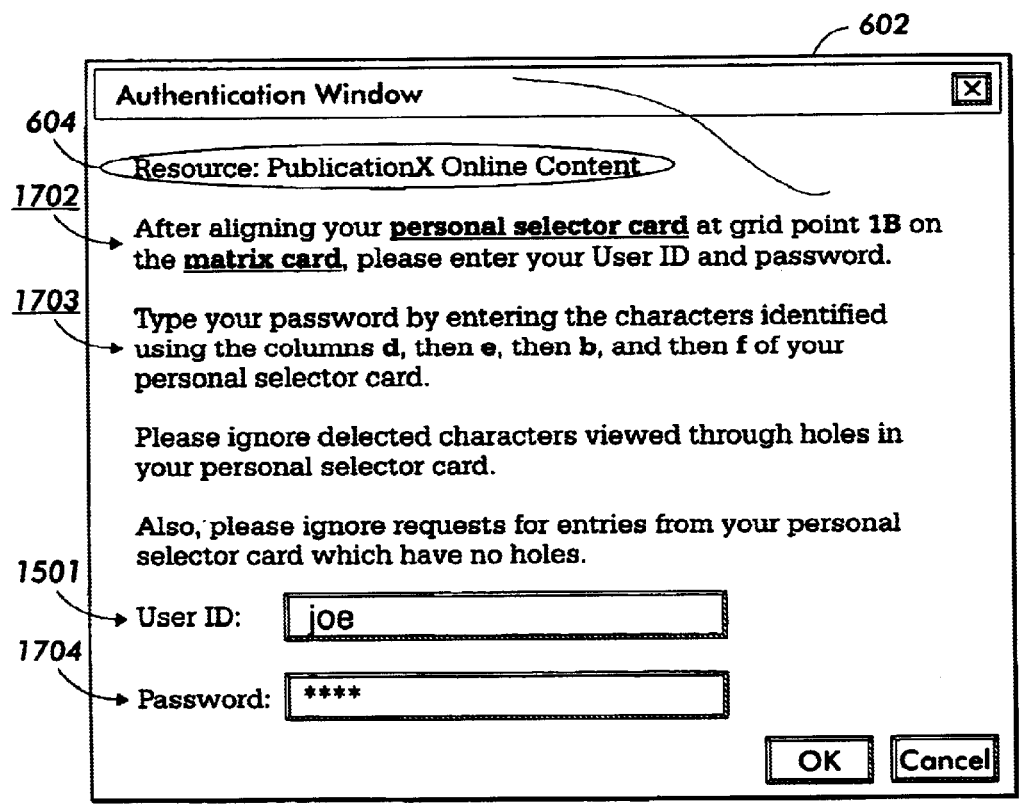
FIG. 17 illustrates an example a challenge to a request for online content with the password mechanism illustrated in FIG. 19 that includes a personal selector card illustrated in FIG. 16 and a character matrix illustrated in FIG. 18.
Figure 18:
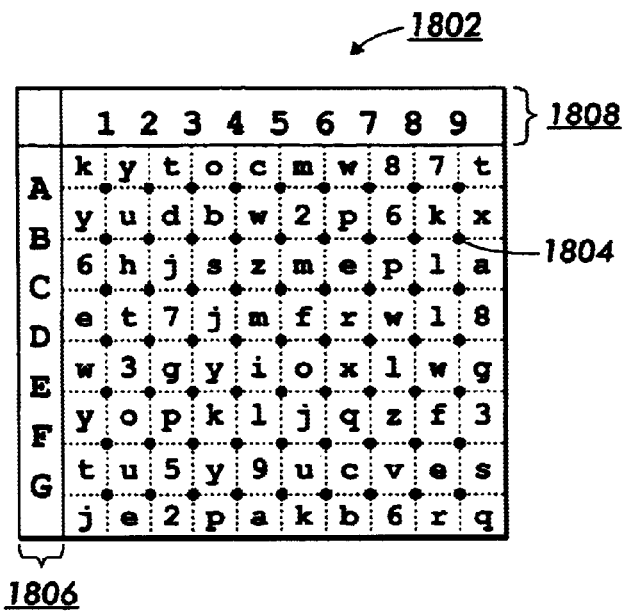
FIG. 18 illustrates an example of a character matrix.
Figure 19:
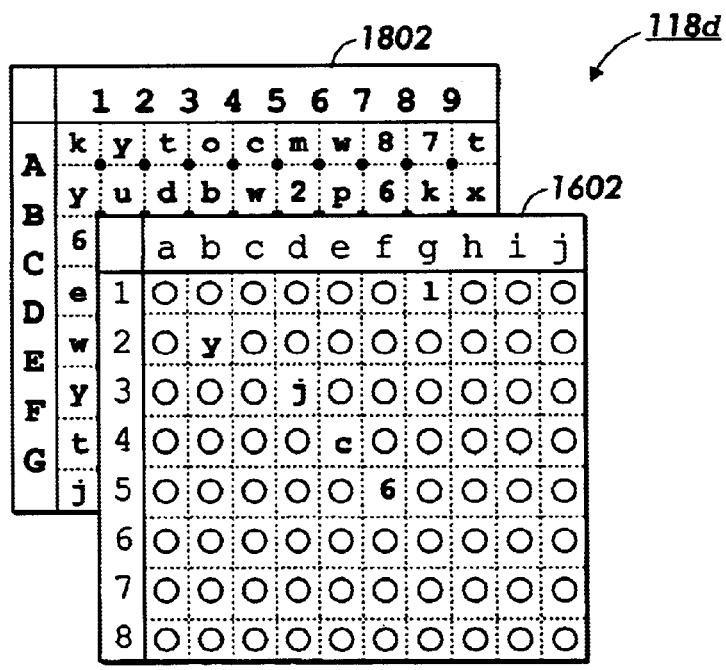
FIG. 19 illustrates a fourth embodiment of the password mechanism shown in FIG. 2 that includes a personal selector card positioned on a grid of a character matrix.

In response to the request for access to online content, the server challenges the request as illustrated in the instance of the authentication window 602 shown in FIG. 17 (step 306, FIG. 3). As illustrated in FIG. 17, the challenge set forth in instructions 1702 in the authentication window 602 requests the user identifier 1501. In addition, the challenge sets forth instructions 1702 for locating the personal selector card 1602 at a given coordinate on a character matrix which is recorded as part of the password mechanism 118 in the hardcopy document 112. FIG. 18 illustrates an example of a character matrix 1802 that is used in combination with the personal selector card 1602 to identify a password entry. In one embodiment, the character matrix 1802 includes grid points 1804 that are addressed using row labels 1806 and column labels 1808. FIG. 19 illustrates an example of subset selection with the resulting password mechanism 118d. As shown in FIG. 19, subset selection involves overlaying the personal selector card 1602 on top of the character matrix 1802 (step 308, FIG. 3).

In the embodiment shown in FIGS. 15–20, the response to the challenge specified using instructions 1703 in FIG. 17 produces a password 1704 defined by the list of characters "jcy6" (step 310, FIG. 3) as shown by the password mechanism 118d in FIG. 19. More specifically, the response to the challenge is determined by following the instructions 1703 to locate the upper left corner of the password selector card 1602 on the grid point "1B" of the character matrix 1802. Proper alignment of the password selector card with the character matrix allows only a subset of the characters on the character matrix to be viewed through those perforated sites that have been punched out to form holes. Included with the instructions 1702 are directions to ignore request for characters on the character matrix that are crossed out yet visible and those characters at locations that are not visible because no hole exist in the selector card.

Figure 20:
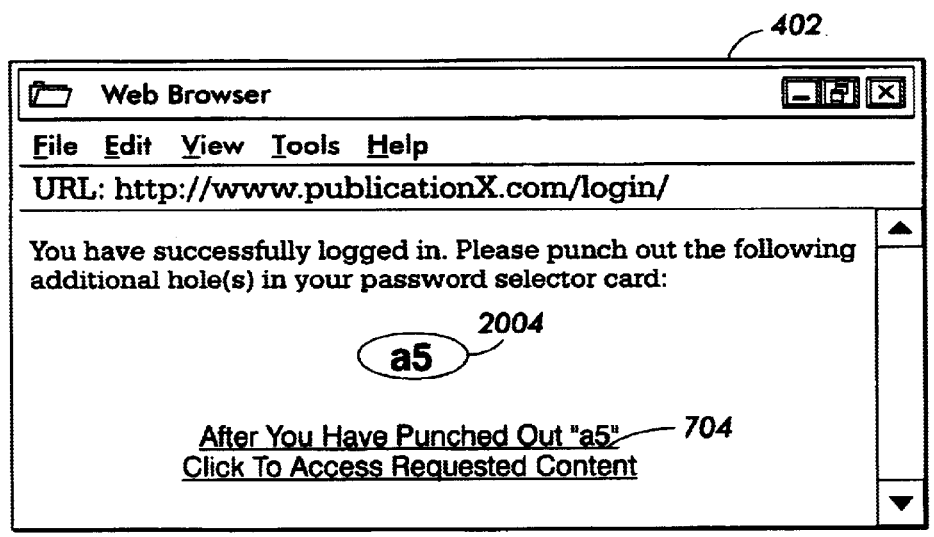
FIG. 20 illustrates a suggested state change of the personal selector card illustrated in FIG. 16 and/or the character matrix illustrated in FIG. 18.

After receiving a valid response to a challenge, the server 108 suggests a state change (step 312, FIG. 3) to the password mechanism 118d. For example, FIG. 20 illustrates a suggested state change to the personal selector card 1602 that involves creating an additional hole at location "a5". In addition, the suggested state change can include or simply consist of a request to align the personal selector card 1602 with the character matrix 1802 at a specified position before crossing out selected characters on the character matrix 1802. These state changes recorded on the password mechanism 118d (step 314, FIG. 3) make copying more difficult by an unauthorized user. Once the server 108 receives an acknowledgment of the suggested state change (step 316, FIG. 3), the server advances the state of the password mechanism 118d (step 318, FIG. 3) and the user is given access to the requested online content (step 320, FIG. 3).

Similar to the user authentication password mechanism 118c, the subset selection password mechanism 118d shown in the Figures requires two login identifiers: a user identifier and a paper identifier. The advantage of using two login identifiers is that the server is able to independently modify two parts of a password mechanism. For example, the state of the personal selector card 1602 (or personal character list 118c) can be modified independent from the state of the character matrix 1802 (or document character list 118b). Allowing two parts of a password mechanism to be independently modified advantageously allows the server 108 to authenticate multiple users that share access to a single hardcopy document (e.g., a library book).

In a variant of the fourth embodiment, the personal selector card 1602 and the character matrix card 1802 are associated with a single login identifier (i.e., a paper identifier or a user identifier) thereby sharing a single state between them.

B.5 Visual Identification of State

Figure 21:
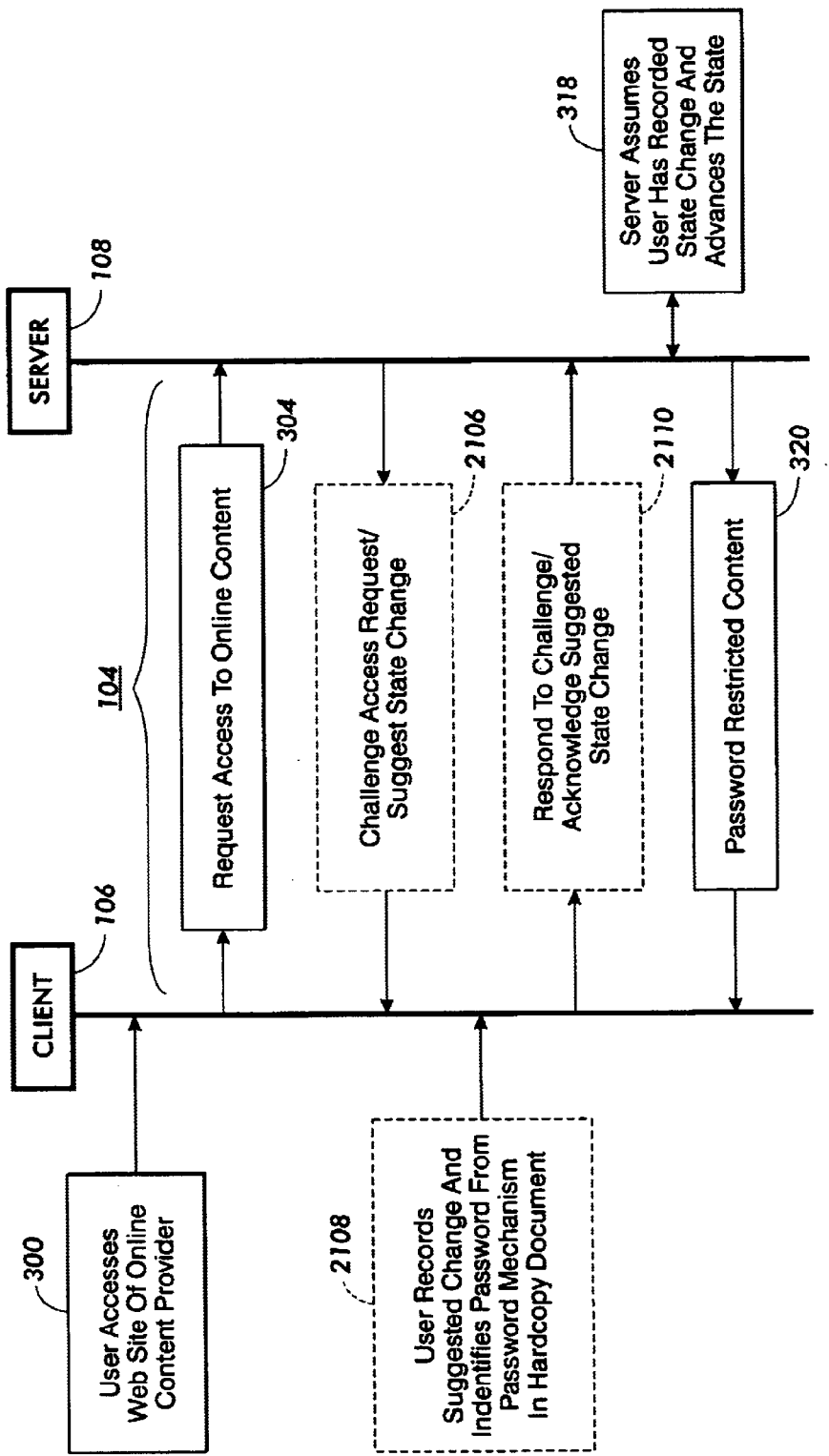
FIG. 21 illustrates a communication sequence for performing a fifth embodiment of the present invention.

FIG. 21 illustrates a communication sequence for performing a fifth embodiment of the present invention which consolidates the communication sequence set forth in FIG. 3. More specifically in this fifth embodiment, the steps 306 and 312 in FIG. 3 are consolidated into step 2106 in FIG. 21, the steps 308 and 314 in FIG. 3 are consolidated into step 2108 in FIG. 21, and the steps 310 and 316 in FIG. 3 are consolidated into step 2110 in FIG. 21. As set forth in FIG. 21, after receiving a request for access to online content at step 304, the server 108 simultaneously challenges the request and suggests a state change at step 2106. FIG. 22 illustrates an example of an instance of the authentication window 602 that issues a challenge that includes a suggested state change. Subsequently at step 2108, the user records the suggested state change and identifies a password from a scratch-off password mechanism to simultaneously respond to the challenge and acknowledge the suggested state change at step 2110.

FIG. 23 illustrates an example of a scratch-off password mechanism 118e for performing the fifth embodiment of the invention. The password mechanism 118e includes a scratch-off covering 2302 that is overlaid on top of a base password matrix 2304. The scratch-off covering 2302 is overprinted with locator information (e.g., locator characters). In order to identify each character in a password, a user must scratch-off the locator information. By scratching off the locator information from the scratch-off covering 2302, the user effectively records a state change. Thus, subsequent requests for access for online content are authenticated using locator information that has not been previously scratched off. In other words, missing locator information provides visual identification of used password material.

In the specific example illustrated in FIGS. 22 and 23, the instructions 2204 received at the client 106 from the server 108 specify selected locator characters (i.e., 2, B, Y, and 8) on the scratch-off covering 2302 of the password mechanism 118e recorded with or in the hardcopy document 110. Note that certain locator characters on the scratch-off covering 2302 repeat. In alternate embodiments with less robust security, each character on the scratch-off covering 2302 is unique, thereby simplifying state change instructions. In the specific example shown in FIGS. 22 and 23, the locator characters "2BY8" indicated by reference number 2306 are scratched-off to identify the password characters "cb6j" indicated by reference number 2308.

In a variant of this embodiment, the scratch-off covering 2302 of the password mechanism 118e only partially covers the password matrix 2304. In this alternate embodiment, row and column labels are used to identify characters on the scratch-off covering 2302 and/or the password matrix 2304. In either embodiment, the advantage of the password mechanism 118e is that is copy resistant. That is, simply making a copy of the scratch-off covering 2302 is not sufficient to compromise the password mechanism 118e. A further advantage of the password mechanism 118e is that the user is capable of visually verifying the unused portion of the password matrix 2304.

C. Transfer Mechanisms

In another alternate embodiment, the password mechanism 118 supports user-to-user transfer of a used hardcopy document with a set of "transfer passwords". When a transfer password is used instead of a password requested by the server, the used characters in the password matrix 2304 are identified so that the current owner of the hardcopy document can verify that the password mechanism 118 is in the correct state. Alternatively after a transfer password is used, the password mechanism is re-initialized and placed in a new state while maintaining the number of unused accesses. Whether the current state of the password mechanism is either verified or re-initialized after using a transfer password, the person to whom the password mechanism is transferred is assured that the current state is valid.

For example, a transfer password would be useful when a fee is paid by a subscriber for a hardcopy document 112 and part of the reason for paying the fee is to gain access to online content a fixed number of times. The transfer password gives a would-be purchaser of a used hardcopy document the ability to verify the status of the password mechanism included with the used hardcopy document. A transfer password can therefore be advantageously used to reveal both the current or newly initialized state of the password mechanism as well as the number of accesses remaining for the password mechanism. The transfer password effectively permits organized transfers of hardcopy documents with used password mechanisms as well as verification of the current state of the password mechanism by the current owner.

D. Alternate Login Identifiers

Figure 24:
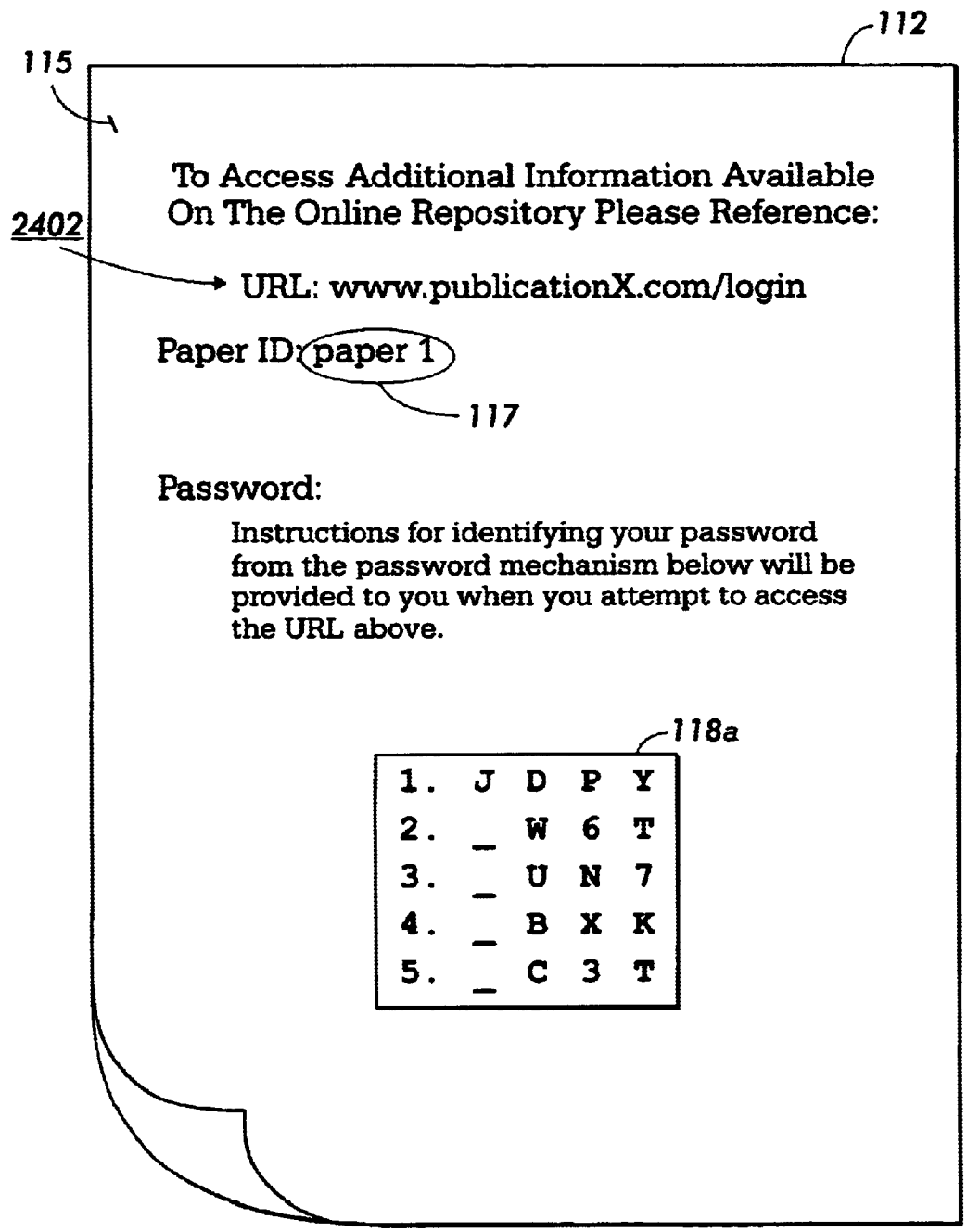
FIG. 24 illustrates an alternate embodiment of the page of the hardcopy document illustrated in FIG. 2.
Figure 25:
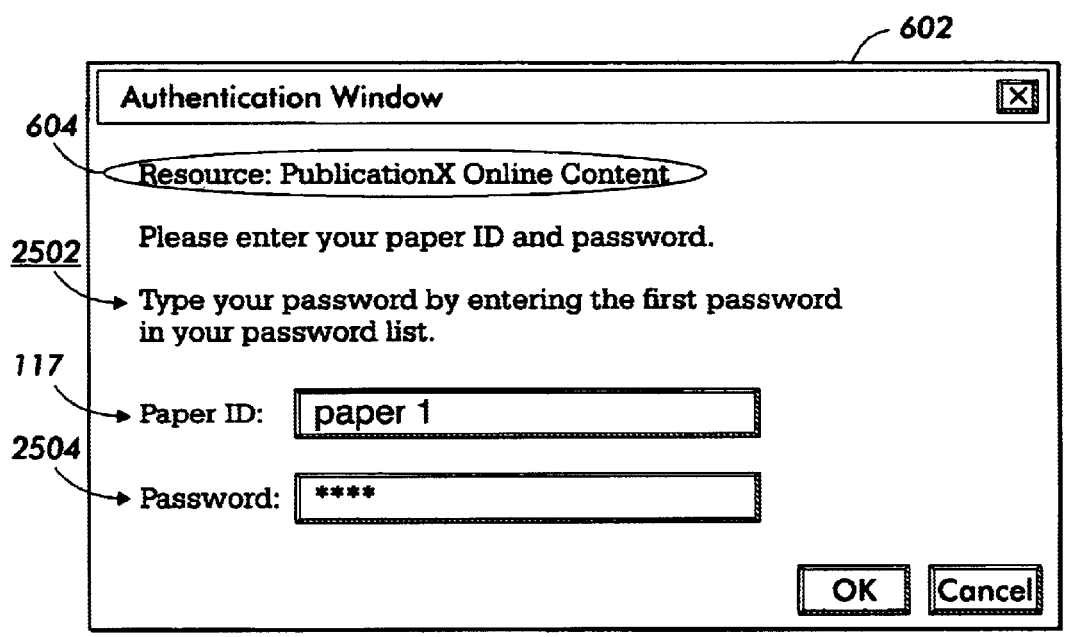
FIG. 25 illustrates the example of a challenge shown in FIG. 4 according to the embodiment of the page of the hardcopy document illustrated in FIG. 24.

FIG. 24 illustrates an alternate embodiment of the page 115 of the hardcopy document 112 shown in FIG. 2. In this alternate embodiment, the paper identifier 117 is not embedded in a URL as shown in FIG. 2. Instead, when the user requests access to online content (step 300, FIG. 3), the user references the URL 2402 to cause the authentication window 602 shown in FIG. 25 to be displayed. In yet another embodiment not shown, the user accesses the authentication window 602 shown in FIG. 26 indirectly through a login link on the web page that is accessed using the URL 118 shown in FIG. 2 (e.g., web page 404 shown in FIG. 4). In either alternate embodiment, the authentication window 602 shown in FIG. 25 contains instructions 2502 that request the input of both the paper identifier 117 and a password 2504. It will be appreciated by those skilled in the art that the method shown in FIG. 25 for identifying the hardcopy document to be authenticated can be applied to the password mechanisms 118b, 118c, 118d, and 118e.

In a further embodiment of the invention, the login identifier (e.g., paper identifier) is omitted when each password mechanism printed on each hardcopy document produces a uniquely identifiable password. That is, if a password is unique, login identifiers may be unnecessary. In this alternate embodiment, however, the server 108 would not be able to issue hints for identifying a password from a password mechanism. Thus, the advantage of using a login identifier is that the server 108 can match a password mechanism in a hardcopy document with a state recorded in the server 108 before challenging a request for access to online content. By knowing the state the server is capable of issuing challenges that require specific action by the user to identify a password from the password mechanism.

E. Summary

To recapitulate, the present invention concerns a password mechanism printed in a hardcopy document for responding to authentication challenges received after a user requests access to online resources available on a server and referenced (e.g., URL) in the hardcopy document. After the user is authenticated using the password mechanism, the user records a state change suggested by the server that provides access to the online content. The state change recorded by the server enables subsequent access to the online content using a password that is entirely or partially changed.

Advantageously, the password mechanisms described herein provide a more secure form of authentication than simple passwords. Security is improved over a simple password because it is difficult for a second user to synchronize the use of a password mechanism with a first user. Since each user can access the online content only once per state change, the effort to collude and defeat the password mechanism may be outweighed by the cost of simply acquiring the hardcopy document that provides access to the desired online content.

It will be appreciated by those skilled in the art that the reference 117 to online content need not be a URL. Instead the reference to online content could be a phone number that when dialed activates touch pad or voice activated email and fax back access to the online (i.e., electronic) content available on server 108.

It will further be appreciated that aspects of the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or computer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for providing secure access to online content referenced in a hardcopy document, comprising the steps of:
   (a) receiving a first request for access to the online content referenced in the hardcopy document;
   (b) issuing a challenge to the first request for online content;
   (c) receiving a first password derived from a password generation mechanism in the hardcopy document in response to the challenge issued at step (b); and
   (d) suggesting a state change to the password generation mechanism on the hardcopy document for identifying a second password to be used during a second request for access to the online content referenced in the hardcopy document.

2. The method according to claim 1, wherein said step (b) further comprises the step of issuing the challenge with a hint for identifying the first password from the password generation mechanism in the hardcopy document.

3. The method according to claim 1, wherein said step (d) further comprises the step of identifying a missing element in the second password.

4. The method according to claim 1, further comprising the steps of:
   (e) receiving the second request for access to the online content referenced in the hardcopy document;
   (f) issuing a challenge to the second request for the online content; and
   (g) receiving the second password derived using the state change to the password generation mechanism in the hardcopy document suggested at said step (d).

5. The method according to claim 1, wherein said step (d) is performed after receiving the first password at said step (c).

6. The method according to claim 5, further comprising the steps of:
   (e) receiving acknowledgment of the state change suggested at said step (d);
   (f) enabling access to the online content using the second password upon receipt of the second request for online content; and
   (g) providing access to the online content when the first password is valid.

7. The method according to claim 1, wherein said step (d) is performed simultaneously with said step (b).

8. The method according to claim 7, wherein said step (c) further comprises the step of receiving acknowledgment of the suggested state change at step (d).

9. The method according to claim 1, wherein said step (d) is performed when the first password is valid.

10. The method according to claim 1, wherein said step (b) is repeated when the first password is invalid.

11. The method according to claim 1, further comprising the step of printing the password generation mechanism on the hardcopy document.

12. The method according to claim 1, further comprising the steps of:
   (e) receiving a request to register for access to online content; and
   (f) suggesting an initial state for identifying the first password.

13. The method according to claim 1, wherein said step (d) further comprises the step of providing a character to complete the second password.

14. The method according to claim 1, wherein said step (d) further comprises tile step of identifying a locator character to scratch off of the password generation mechanism.

15. The method according to claim 1, wherein the state change to the password generation mechanism on the hardcopy document suggested at said step (d) is in a form that is humanly readable.

16. The method according to claim 1, wherein said step (c) further comprises the step of receiving a login identifier of the hardcopy document.

17. A server for providing secure access to online content referenced in a hardcopy document, comprising:
   means for receiving a first request for access to the online content referenced in the hardcopy document;
   means for issuing a challenge to the first request for online content;
   means for receiving a first password derived from a password generation mechanism in the hardcopy document in response to the issued challenge; and
   means for suggesting a state change to the password generation mechanism on the hardcopy document for identifying a second password to be used during a second request for access to the online content referenced in the hardcopy document.

18. A hardcopy document, comprising:
   a reference for identifying online content on a network; and
   a password generation mechanism for providing a first password to respond to a first challenge to a first request for the online content; the password generation mechanism further comprising means for recording a state change;
   the state change providing a second password to respond to a second challenge to a second request for the online content; and
   wherein the first challenge and the second challenge include instructions for identifying the first password and the second password with the password generation mechanism.

* * * * *